(12) United States Patent
Oomori

(10) Patent No.: US 7,590,769 B2
(45) Date of Patent: *Sep. 15, 2009

(54) DATA COMMUNICATION APPARATUS AND TRANSMISSION RESERVATION MANAGING METHOD

(75) Inventor: Akira Oomori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 458 days.

This patent is subject to a terminal disclaimer.

(21) Appl. No.: 11/530,330

(22) Filed: Sep. 8, 2006

(65) Prior Publication Data

US 2007/0022171 A1    Jan. 25, 2007

Related U.S. Application Data

(63) Continuation of application No. 09/826,557, filed on Apr. 5, 2001, now Pat. No. 7,127,532.

(30) Foreign Application Priority Data

| Apr. 6, 2000 | (JP) | ............................. 2000-104677 |
| Mar. 28, 2001 | (JP) | ............................. 2001-092673 |

(51) Int. Cl.
    *G06F 3/00*    (2006.01)
(52) U.S. Cl. ........................................... 710/8; 710/16
(58) Field of Classification Search .................... 710/8, 710/12, 16, 17, 19; 358/400, 468; 709/231, 709/232
    See application file for complete search history.

(56) References Cited

U.S. PATENT DOCUMENTS

| 5,973,791 | A | 10/1999 | Yamamuro et al. |
| 6,248,996 | B1 | 6/2001 | Johnson et al. |
| 6,437,875 | B1 * | 8/2002 | Unno ........................ 358/1.16 |
| 6,476,935 | B1 | 11/2002 | Fujino |
| 6,577,409 | B1 | 6/2003 | Barker et al. |
| 7,224,491 | B2 * | 5/2007 | Shinchi et al. .............. 358/400 |
| 7,324,139 | B2 * | 1/2008 | Watanabe ................ 348/231.3 |
| 7,373,396 | B2 * | 5/2008 | Sato ........................... 709/220 |
| 7,405,844 | B2 * | 7/2008 | Ferlitsch ..................... 358/1.6 |

FOREIGN PATENT DOCUMENTS

| JP | 9-65034 A | 3/1997 |
| JP | 10-301863 A | 11/1998 |
| JP | 11-146174 A | 5/1999 |
| JP | 11-168523 A | 6/1999 |
| JP | 11-234496 A | 8/1999 |
| JP | 11-313170 A | 11/1999 |

* cited by examiner

*Primary Examiner*—Khanh Dang
(74) *Attorney, Agent, or Firm*—Rossi, Kimms & McDowell, LLP

(57) ABSTRACT

There are provided a data communication apparatus and a transmission reservation managing method that are capable of collectively managing transmissions of the same or common data by a plurality of transmission methods. A plurality of destinations for the same data input by the input means are designated. The plurality of destinations being destinations to which data are to be transmitted by respective different transmission methods the same data are transmitted to the designated destinations by the respective different transmission methods. Information related to transmission by the data communication apparatus are managed by associating a predetermined identifier with each of the input data.

10 Claims, 19 Drawing Sheets

FIG. 3

| RECEPTION NUMBER | RECEPTION TIME | NUMBER OF PAGES | DESTINATION | STATUS |
|---|---|---|---|---|
| 0001 | 10:20 | 3 | abc@mail.co.jp | Sending |
| 0001 | 10:20 | 3 | ftp.co.jp | Sending |
| 0001 | 10:20 | 3 | database.co.jp | Completed |
| 0002 | 10:23 | 2 | xxx@mail.co.jp | Waiting |
| 0002 | 10:23 | 2 | ftp2.co.jp | Waiting |
| 0002 | 10:23 | 2 | database2.co.jp | Sending |
|  |  |  |  |  |

*FIG. 8*

| RECEPTION NUMBER | RECEPTION TIME | NUMBER OF PAGES | DESTINATION | STATUS |
|---|---|---|---|---|
| 0001 | 10:20 | 3 | abc@mail.co.jp | Sending |
| 0001 | 10:20 | 3 | ftp.co.jp | Sending |
| 0001 | 10:20 | 3 | database.co.jp | Completed |
| 0002 | 10:23 | 2 | xxx@mail.co.jp | Waiting |
| 0002 | 10:23 | 2 | ftp2.co.jp | Waiting |
| 0002 | 10:23 | 2 | database2.co.jp | Sending |
|  |  |  |  |  |

CANCEL

301

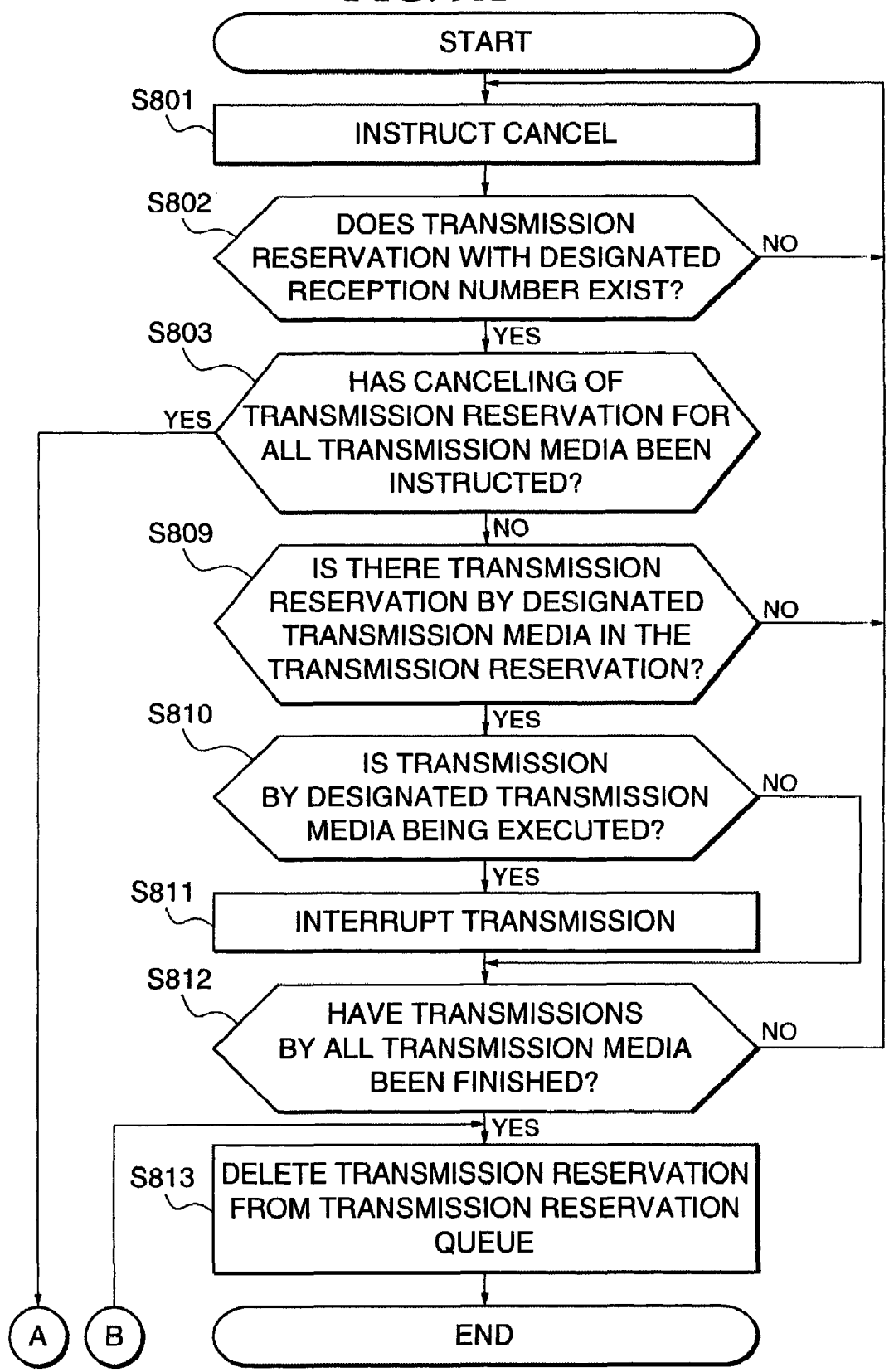

FIG. 10

| RECEPTION NUMBER | RECEPTION TIME | NUMBER OF PAGES | DESTINATION | STATUS |
|---|---|---|---|---|
| 0001 | 10:20 | 3 | abc@mail.co.jp | Sending |
| 0002 | 10:32 | 4 | ftp.co.jp | Waiting |
| 0005 | 10:35 | 1 | database.co.jp | Waiting |
|  |  |  |  |  |
|  |  |  |  |  |
|  |  |  |  |  |
|  |  |  |  |  |

CANCEL

302

DATA COMMUNICATION APPARATUS AND TRANSMISSION RESERVATION MANAGING METHOD

This is a continuation of application Ser. No. 09/826,557 filed on Apr. 5, 2001.

BACKGROUND OF THE INVENTION

1. Field of the Invention

The present invention relates to a data communication apparatus for transmitting data input from an image reading device or the like to a plurality of destinations having different transmission methods, and a transmission reservation managing method applicable to the data communication apparatus.

2. Related Background Art

A data communication apparatus that is capable of transmitting image data obtained by reading images from originals with a scanner to destinations by a plurality of transmitting methods (transmission protocols) such as E-mail, FTP (File Transfer Protocol) and Database, has been conventionally available for practical use.

When the same image data are to be sent to a plurality of destinations by such an apparatus, management of transmission reservations is executed by each transmitting instruction for a destination so that operations such as canceling or interruption of transmission, display of transmission status, etc. are executed individually in response to each transmission instruction.

However, in the above-mentioned situation where transmission management is executed by each transmission instruction, it has been difficult to ascertain the status of respective transmissions of the same image data to various destinations, and to ascertain the status of transmission for each transmission method. This has given rise to a problem in that the overall status of transmission is not easy to grasp and instructions, e.g., for interruption of transmission, cannot be readily issued.

SUMMARY OF THE INVENTION

It is an object of the present invention to provide a data communication apparatus and a transmission reservation managing method that are free of the above described problems.

It is another object of the present invention to provide a data communication apparatus and a transmission reservation managing method that are capable of collectively managing transmissions of the same or common data by a plurality of transmission methods.

It is still another object of the present invention to provide a data communication apparatus and a transmission reservation managing method that are capable of managing transmissions of common data by a plurality of transmission methods not only collectively but also separately and individually for each transmission method.

It is a further object of the present invention to provide a data communication apparatus and a transmission reservation managing method which are capable of managing transmissions of data separately and individually for each transmission method, and which are capable of issuing instructions for transmission of data collectively for each transmission method.

To attain the above objects, in a first aspect, the present invention provides a data communication apparatus comprising input means for inputting data, designating means for designating a plurality of destinations for the same data input by the input means, the plurality of destinations being destinations to which data are to be transmitted by respective different transmission methods, transmitting means for transmitting the same data to the plurality of destinations designated by the designating means by the respective different transmission methods, and managing means for managing information related to transmission by the transmitting means by associating a predetermined identifier with each of the data input by the input means.

Preferably, the data communication apparatus further comprises display means for displaying a list based on the information managed by the managing means.

Typically, the transmitting means is capable of transmitting data using at least one transmission method of E-mail and FTP (File Transfer Protocol).

Preferably, the data communication apparatus further comprises a reader for reading images on originals and generating image data corresponding to the images, and wherein the input means inputs data from the reader.

Also preferably, the managing means further manages the information related to the transmission by the transmitting means in a manner discriminating items of the information from each other according to the respective different transmission methods.

Advantageously, the data communication apparatus further comprises reception means for receiving instructions from a user.

In a preferred form, the managing means is responsive to receiving an instruction for transmission interruption together with the identifier by the reception means, for interrupting transmissions to the plurality of destinations corresponding to the identifier.

Alternatively, the managing means is responsive to receiving an instruction for transmission interruption together with one of the respective different transmission methods by the reception means, for interrupting a transmission to one of the destinations that is associated with the one of the respective different transmission methods.

Further alternatively, the managing means is responsive to receiving an instruction for changing of destination by the reception means, for changing one of the plurality of destinations for which the changing of destination was instructed.

To attain the above objects, in a second aspect, the present invention provides a method of managing transmission reservations, comprising an input step of inputting data, a designating step of designating a plurality of destinations for the same data input by the input step, the plurality of destinations being destinations to which data are to be transmitted by respective different transmission methods, a transmitting step of transmitting the same data to the plurality of destinations designated by the designating step by the respective different transmission methods, and a managing step of managing information related to transmission by the transmitting step by associating a predetermined identifier with each of the data input by the input step.

To attain the above objects, the present invention provides a program for controlling a data communication apparatus, comprising an input module for inputting data, a designating module for designating a plurality of destinations for the same data input by the input module, the plurality of destinations being destinations to which data are to be transmitted by respective different transmission methods, a transmitting module for transmitting the same data to the plurality of destinations designated by the designating module by the respective different transmission methods, and a managing module for managing information related to transmission by the transmitting module by associating a predetermined identifier with each of the data input by the input module.

The above and other objects of the present invention will become more apparent from detailed description of the invention with reference to following drawings.

BRIEF DESCRIPTION OF THE DRAWINGS

FIG. 3 is a view showing an example of a screen view of transmission reservation status displayed on the display device;

FIG. 8 is a view showing an example of a transmission reservation status screen view displayed on a display device according to a second embodiment of the present invention;

FIGS. 9A and 9B are a flow chart showing the procedure of an interruption process for canceling transmission reservations retained in the transmission reservation queue for each transmission medium;

FIG. 10 is a view showing an example of a screen view of transmission reservation status displayed on the display device which is composed of a touch panel display, according to a third embodiment of the present invention;

DETAILED DESCRIPTION OF THE PREFERRED EMBODIMENTS

The present invention will now be described in detail with reference to the drawings showing embodiments thereof.

First Embodiment

Figure 1:
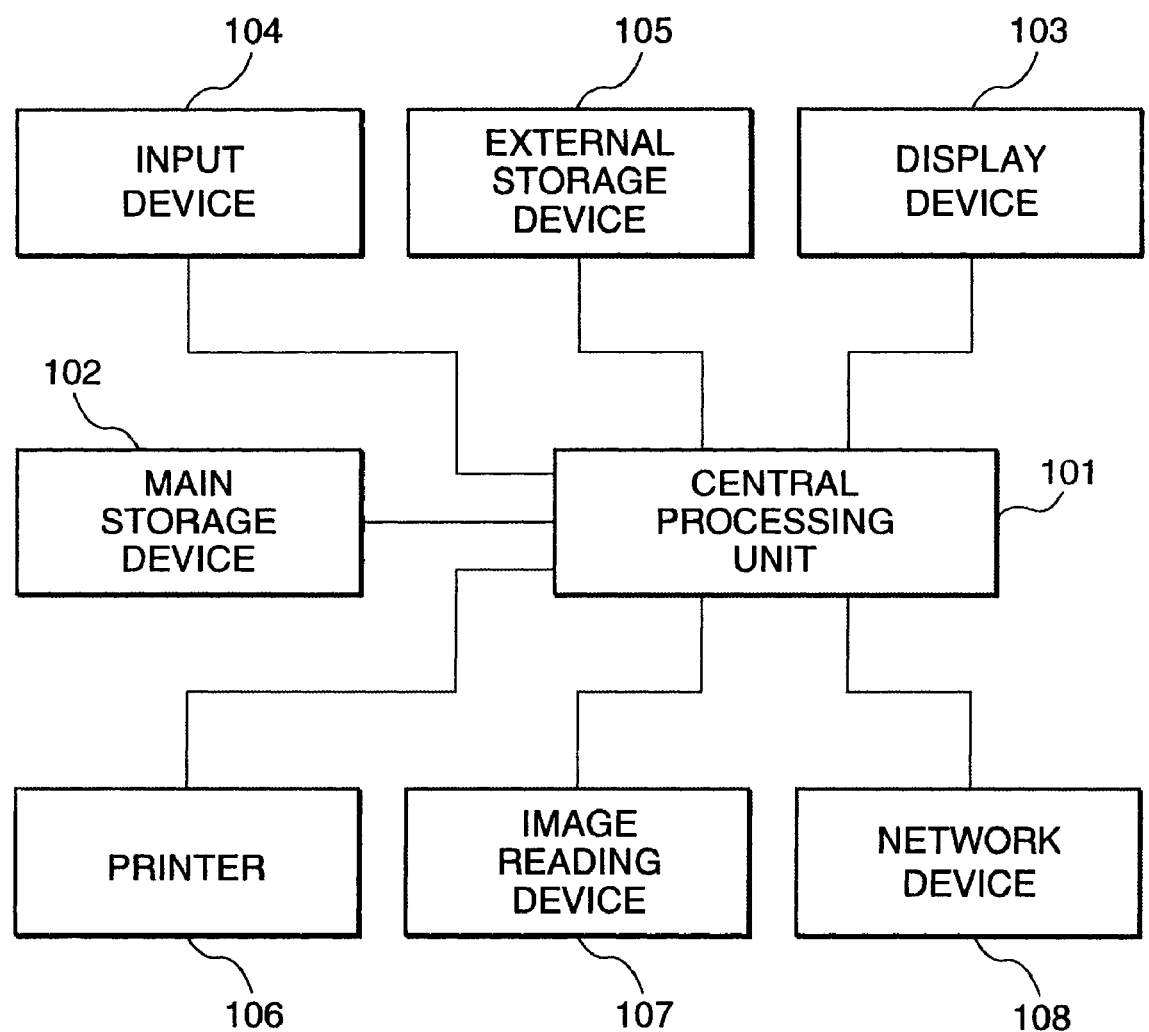
FIG. 1 is a block diagram showing the construction of an image reading and transmitting apparatus to which is applied a data communication apparatus according to an embodiment of the present invention.

FIG. 1 is a block diagram showing the construction of an image reading and transmitting apparatus to which is applied a data communication apparatus according to a first embodiment of the present invention.

The image reading and transmitting apparatus apparatus is mainly comprised of a central processing unit 101, a main storage device 102, a display device 103, an input device 104, an external storage device 105, a printer 106, an image reading device 107, and a network device 108. The central processing unit 101 controls the operations of the main storage device 102, the display device 103, the input device 104, the external storage device 105, the printer 106, the image reading device 107, and the network device 108, and performs arithmetic operations and logic operations. The main storage device 102 stores information required for the central processing unit 101 to perform information processing, and such information is read out from the main storage device 102 as necessary. The display device 103 is composed of a touch panel display, and displays results of processing executed by the central processing unit 101 in the form of graphics and characters. The input device 104 is composed of a keyboard, a touch panel, and the like, and inputs various data to the central processing unit 101. The external storage device 105 is composed of a magnetic storage medium, a magneto-optical storage medium, or the like, and stores various kinds of information. The external storage device 105 can store image data that are read by the image reading device 107. Flow charts as described below show the flow of processing controlled by the central processing unit 101 based on programs stored in the external storage device 105. The image reading device 107 converts images of originals into electronic information. The network device 108 connects the image reading and transmitting device to a computer network to which various terminals can be connected. In the present embodiment, an automatic document feeder, now shown, that conveys a plurality of originals automatically and successively one by one to the original reading position in response to the instruction for reading originals, is attached to the image reading and transmitting device.

Figure 2:
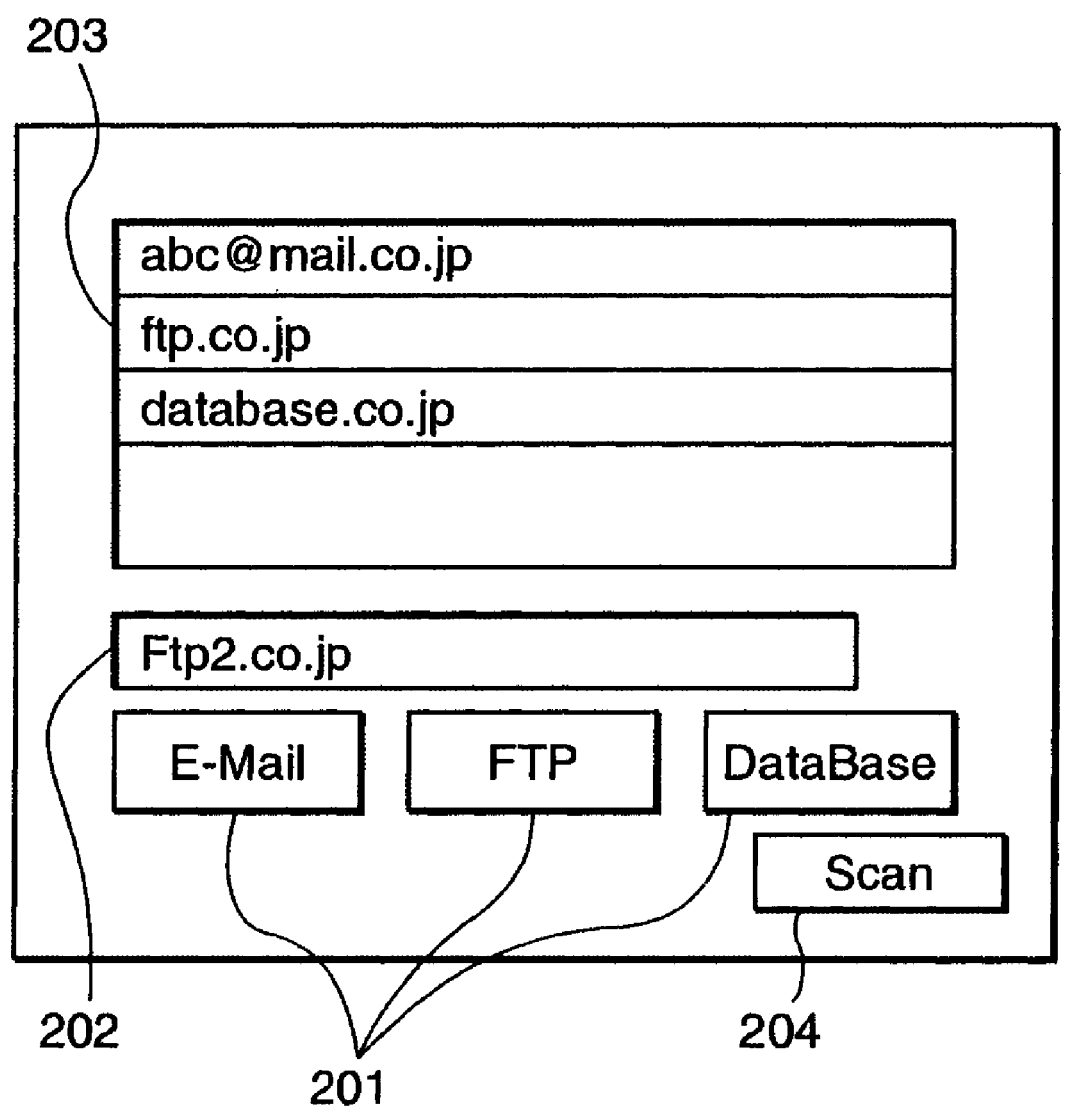
FIG. 2 is a view showing an input screen view displayed on a display device which is composed of a touch panel display.

FIG. 2 is a view showing an input screen view displayed on the display device 103 composed of a touch panel display. On this screen view, destinations can be input, and instructions for reading and transmission of image data can be issued.

In the figure, if a destination is input to a destination input field 202 and a destination addition button 201 is depressed, the input destination is added to a destination display field 203 as a transmitting destination. The destination addition button 201 consists of three buttons, and depending upon whether the input destination is an E-mail address, an FTP, or a Database, an appropriate one of the buttons is depressed. By depressing a scan start button 204, reading of an image is started and transmission of the image data to the destination displayed in the destination display field 203 is started.

FIG. 3 is a view showing an example of a transmission reservation status screen view displayed on the display device 103 composed of a touch panel display.

In the transmission reservation status screen view, columns of reception number, reception time, number of pages (to be sent), destination (of transmission), status (of transmission) are provided. The reception number is an identification number of the transmission reservation issued at the time when the transmission reservation is received, and each transmission reservation is associated with a unique reception number (usually, the reception number is incremented by one for each transmission reservation). When a plurality of transmission media such as E-mail, FTP, and Database are instructed as destinations in the same transmission reservation, the same reception number is assigned to these destinations to indicate that the transmissions belong to the same transmission reservation (transmissions of common transmission data). In addition, the transmissions belonging to the same transmission reservation are displayed at different lines for respective transmission media. Thus, the transmission status of the respective transmissions can be displayed individually so as for the user to easily grasp the transmission status.

Figure 4:
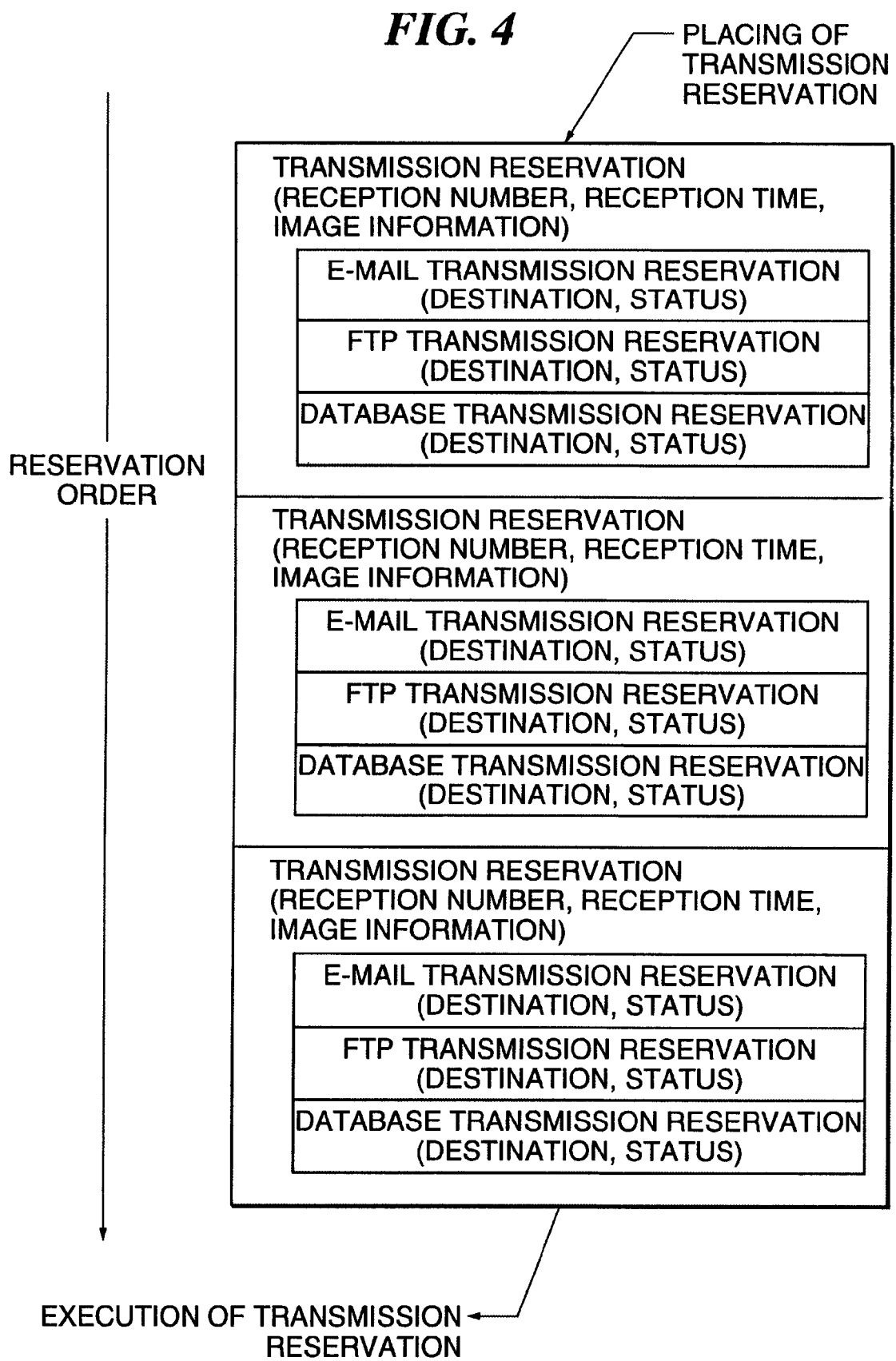
FIG. 4 is a view showing a transmission reservation queue.

FIG. 4 is a view showing a transmission reservation queue. The transmission reservation queue is provided, for example, in the external storage device 105.

A new transmission reservation is added to the end of the transmission reservation queue, and transmissions are carried out starting with the first one in the order of transmission reservation. Each transmission reservation is distinguished within the transmission reservation queue by the unique reception number. In the present embodiment, the transmission is managed collectively for each transmission reservation (each reception number), and also separately for each transmission medium (transmission protocol). Thus, even if transmissions to all instructed transmission media have not been completed for a transmission reservation, a transmission for the next transmission reservation can be started in the transmission medium that is ready for transmission. More specifically, for example, when the first FTP transmission has been completed, a FTP transmission for the next transmission reservation can be started even if an E-mail transmission and a Database transmission for the first transmission reservation have not been completed.

Figure 5:
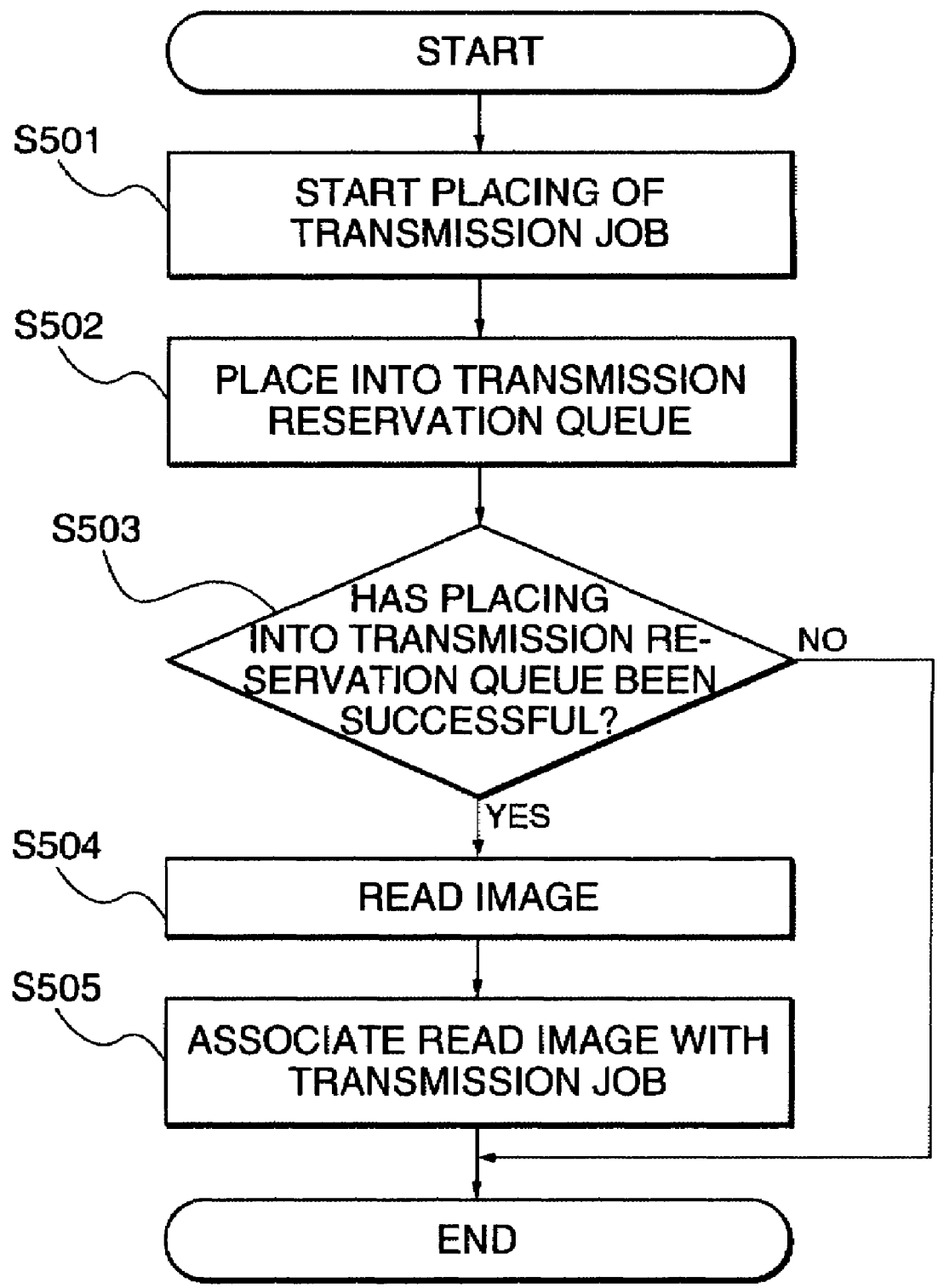
FIG. 5 is a flow chart showing the procedure of an enqueuing process for placing transmission reservations into the transmission reservation queue.

FIG. 5 is a flow chart showing the procedure of an enqueuing process for placing transmission reservations into the transmission reservation queue.

At a step S501, the enqueuing process is started when a destination is designated and placing of a transmission reservation (transmission job) into the transmission reservation queue is instructed by the user using the touch panel.

At a step S502, the transmission reservation is added to the end of the transmission reservation queue (FIG. 4). The maximum number of transmission jobs that can be stored in the transmission reservation queue is limited, and an error message is displayed if the maximum number is exceeded.

At a step S503, it is determined whether placing of the transmission reservation into the transmission reservation queue at the step S502 has succeeded or not, and if it is determined that placing of the transmission reservation at the step S502 has failed, the process skips steps S504 and S505. If it is determined that placing of the transmission reservation at the step S502 has succeeded, the process proceeds to the step S504, where reading of an image is executed by the image reading device 107, and at the step S505, the read image is associated with the transmission reservation (reception number).

Figure 6:
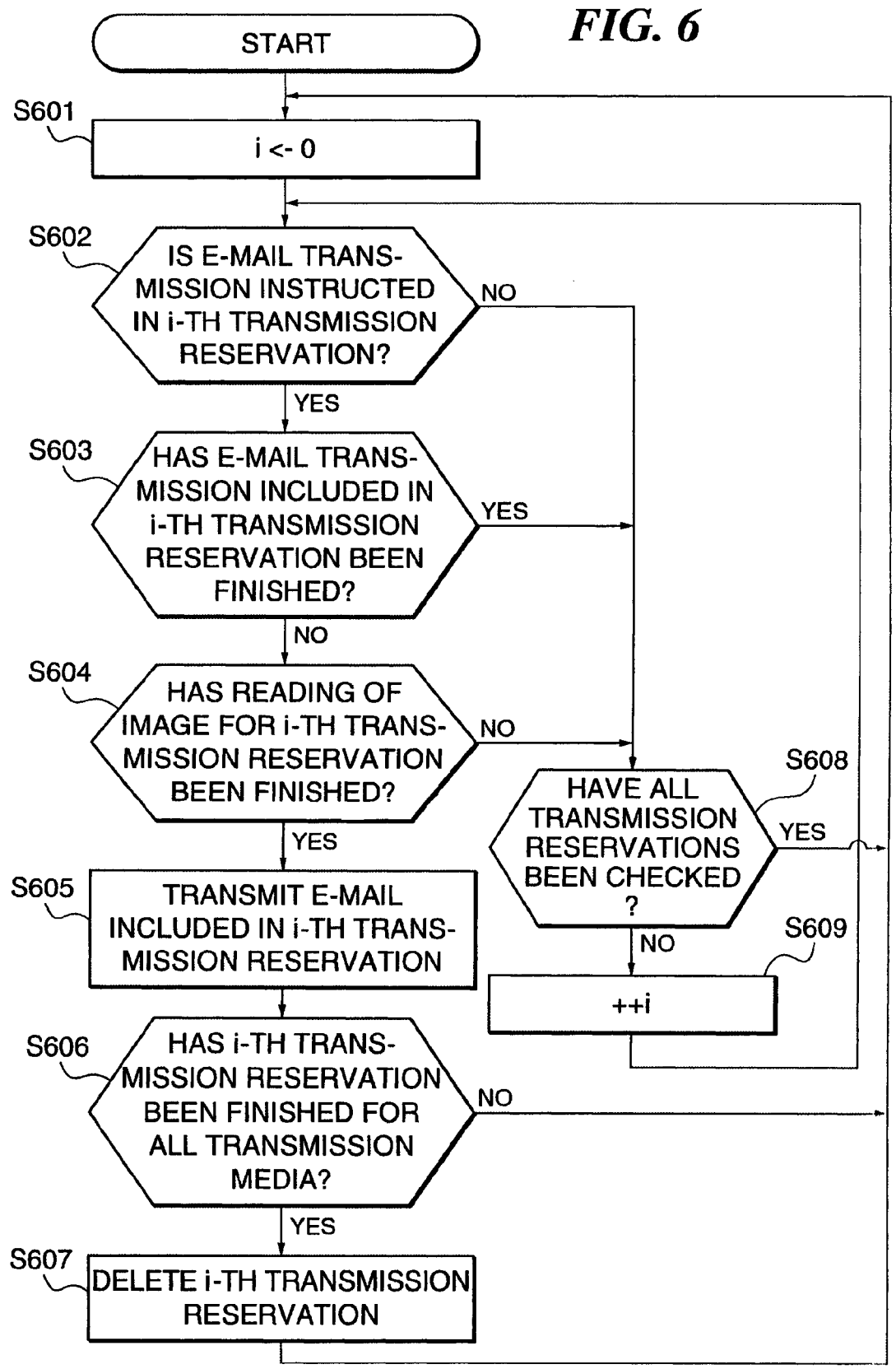
FIG. 6 is a flow chart showing the procedure of a process for executing reserved transmission jobs stored in the transmission reservation queue in the order of reservation.

FIG. 6 is a flow chart showing the procedure of a process for executing reserved transmission jobs stored in the transmission reservation queue in the order of reservation. The flow chart shows the procedure of a process for executing a reserved E-mail transmission. FTP and Database transmissions are also executed in similar manners as shown in this flow chart, and in parallel to the present process.

At a step S601, a value 0 is substituted into a variable i for initialization.

At a step S602, it is determined whether an E-mail transmission is included in the i-th transmission reservation in the order of reservation in the transmission reservation queue shown in FIG. 4 or not. If the answer is affirmative, the process proceeds to a step S603, while if the answer is negative, the process proceeds to a step S608.

At the step S603, it is determined whether the E-mail transmission included in the i-th transmission reservation in the transmission reservation queue has been finished or not. If it is determined that the E-mail transmission has not been finished, the process proceeds to a step S604, while if it is determined that the E-mail transmission has been finished, the process proceeds to a step S608.

At the step S604, it is determined whether reading of an image associated with the i-th transmission reservation in the transmission reservation queue has been finished or not. If it is determined that the reading of the image has been finished, the process proceeds to a step S605, while if it is determined that the reading of the image has not been finished, the process proceeds to the step S608.

At the step S605, E-mail transmission of the image which is associated with the i-th transmission reservation and of which reading has been determined at the step S604 to have been finished, is executed. In the present embodiment, E-mail transmission is executed by transmitting the image data from the image reading device 107 as an attachment in a predetermined format.

At a step S606, it is determined whether transmissions by all of the transmission media included in the i-th transmission reservation in the transmission reservation queue, that is, transmissions by all of E-mail, FTP, and Database, have been finished or not. If the answer is affirmative, the process proceeds to a step S607, while if the answer is negative, the process returns to the step S601 to monitor the next transmission.

At the step S607, the i-th transmission reservation in the transmission reservation queue is deleted, and the process returns to the step S601.

At the step S608, it is determined whether the determination at the step S602 has been done for all the E-mail transmission reservations in the transmission reservation queue or not. If the answer is negative, the variable i is incremented by one (step S609), and the process returns to the step S602. If the answer is affirmative, the process returns to the step S601, and the transmission reservation queue is monitored from the start.

Figure 7:
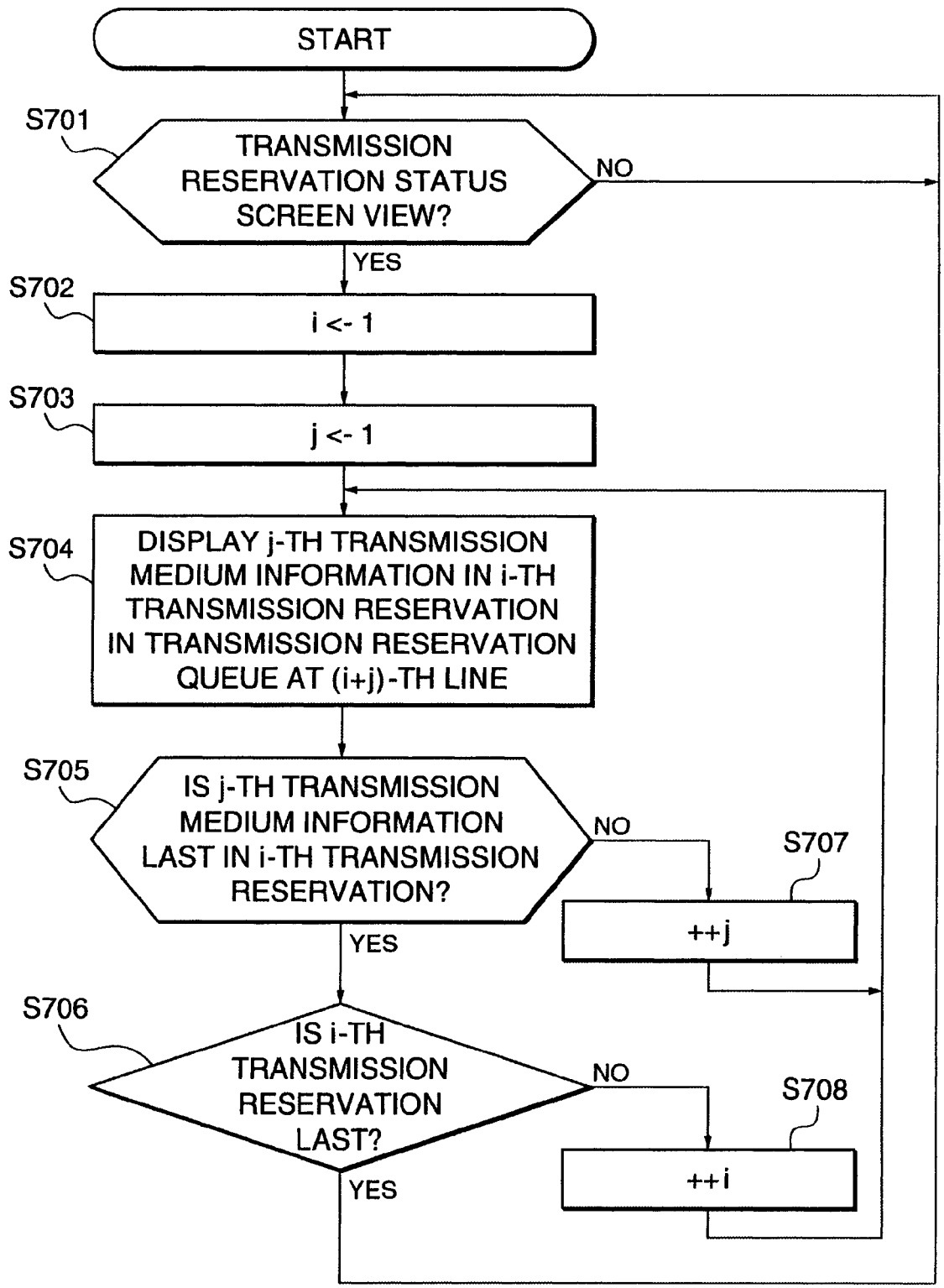
FIG. 7 is a flow chart showing the procedure of a display process for displaying transmission reservations maintained in the transmission reservation queue according to transmission media.

FIG. 7 is a flow chart showing the procedure of a display process for displaying transmission reservations maintained in the transmission reservation queue according to transmission media.

At a step S701, it is determined whether the display device has been set to display the transmission reservation status screen view as exemplified in FIG. 3 or not. If the display device has been so set, the process proceeds to a step S702.

At the step S702, an initial value 1 is substituted into the variable i. The variable i corresponds to the reservation orders of a plurality of transmission reservations included in the transmission reservation queue as shown in FIG. 4.

At a step S703, an initial value 1 is substituted into a variable j. The variable j corresponds to the arranging order of the transmission reservations for a plurality of transmission media included in each transmission reservation in the transmission reservation queue.

At a step S704, among the plurality of transmission reservations included in the transmission reservation queue, a transmission reservation for the transmission medium in the j-th arranging order in the i-th transmission reservation, is displayed on the transmission reservation status screen view of the display device 103 as exemplified in FIG. 3 as information at (i+j)-th line.

At a step S705, it is determined whether the transmission reservation for the j-th transmission medium is for the last transmission medium in the i-th transmission reservation or not. If the answer is affirmative, that is, if the transmission reservation is for the last transmission medium, the process proceeds to a step S706, while if the answer is negative, the process proceeds to a step S707, where the variable j is incremented by one and the process returns to the step S704.

At the step S706, it is determined whether the i-th transmission reservation is the last transmission reservation in the reservation order or not. If it is not the last transmission reservation, the process proceeds to a step S708, where the variable i is incremented by one and the process returns to the step S704. If it is the last transmission reservation, the process returns to the step S701, where the latest transmission reservation status is displayed. Thus, the user can be always kept informed of the latest transmission reservation status.

As described above, according to the first embodiment, in transmitting the same image simultaneously by a plurality of different transmission media, the transmission status can be ascertained for each transmission medium every transmission reservation.

Second Embodiment

Next, a second embodiment of the present invention will be described.

The construction of the second embodiment is basically the same as that of the first embodiment, and therefore, description of the construction of the first embodiment is applied to the second embodiment where appropriate, and only components which differ from those of the first embodiment will be described.

FIG. 8 shows an example of a transmission reservation status screen view displayed on the display device 103 according to the second embodiment.

In the second embodiment, a cancel button 301 is newly added. The added button 301 is for inputting an instruction for interrupting a transmission. By clicking the cancel button 301 after a specific position in the transmission reservation status screen view is selected by a cursor, a transmission interrupting process corresponding to the above-mentioned specific position is executed. More specifically, if, for example, a specific reception number has been selected by the cursor, it is determined that the reception number alone has been designated, and transmission reservations for all the transmission media included in the transmission reservation of the reception number are interrupted. If, on the other hand, a specific destination has been selected by the cursor, it is determined that the reception number and the transmission reservation for the transmission medium have been designated, and among transmission reservations for a plurality of transmission media included in the transmission reservation of the reception number corresponding to the position selected by the cursor, only the transmission reservation for the transmission medium corresponding to the position selected by the cursor is interrupted. The interrupting process for interrupting transmissions using the cancel button 301 will be described below.

Figure 9B:
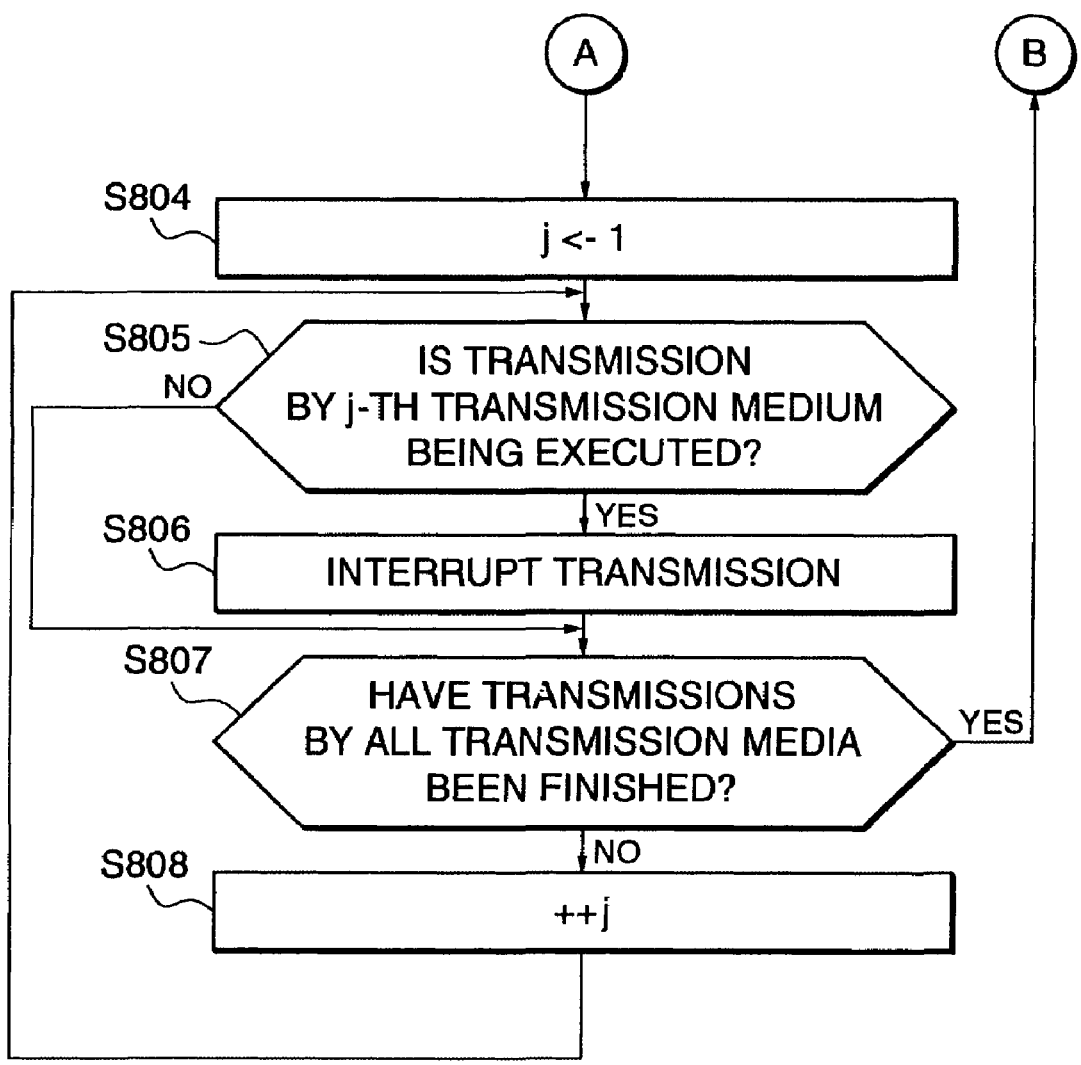

FIGS. 9A and 9B are a flow chart showing the procedure of the canceling process for canceling transmission reservations retained in the transmission reservation queue for each transmission medium.

At a step S801, the user operates the cursor and the cancel button 301 on the transmission reservation status screen view shown in FIG. 8.

At a step S802, it is determined whether a transmission reservation with the reception number designated by the user exists in the transmission reservation queue or not. If the answer is affirmative, the process proceeds to a step S803. If the answer is negative, the process returns to the step S801 and waits for the next clicking of the cancel button 301.

At the step S803, it is determined whether canceling of transmission reservations for all the transmission media included in the transmission reservation with the designated reception number has been instructed by the user or not. If the answer is affirmative, the process proceeds to a step S804. If canceling of a transmission reservation only for a specific transmission medium among the transmission reservations for the plurality of transmission media has been instructed, the process proceeds to a step S809.

At the step S804, a value 1 is substituted into the variable j. The variable j corresponds to the arranging order of the transmission reservations for a plurality of transmission media included in each transmission reservation in the transmission reservation queue.

At a step S805, it is determined whether a process of carrying out the transmission reservation for the j-th transmission medium in the transmission reservation with the designated reception number is being executed or not. If it is being executed, the process proceeds to a step S806, where the transmitting process of carrying out the transmission reservation for the j-th transmission medium is canceled. If it is not being executed, the process skips the step S806.

At a step S807, it is determined whether the transmission reservation for the j-th transmission medium is the last in the arranging order of transmission reservations for transmission media in the transmission reservation with the designated reception number or not. If it is not the last in the arranging order, the process proceeds to a step S808, where the variable j is incremented by one, and the process returns to the step S805. If it is the last in the arranging order, the transmission reservation with the designated reception number is deleted from the transmission reservation queue.

At the step S809, it is determined whether the transmission reservations with the designated reception number include a transmission reservation for the designated transmission medium or not. If the former include no transmission reservation for the designated transmission medium, the process returns to the step S801, and waits for the next clicking of the cancel button 301. If the former include a transmission reservation for the designated transmission medium, the process proceeds to a step S810.

At the step S810, it is determined whether a process of carrying out the transmission reservation for the designated transmission medium is being executed or not. If it is being executed, the process proceeds to a step S811, where the transmitting process based on the transmission reservation for the designated transmission medium is interrupted. If it is not being executed, the process skips the step S811.

At a step S812, it is determined whether there is any transmission reservation for the transmission medium included in the transmission reservation with the designated reception number for which the transmitting process has not been finished or not. If all transmission reservations for the transmission medium have been finished, the process proceeds to the step S813. If there is any transmission reservation for the transmission medium for which the transmitting process has not been finished, the process returns to the step S801.

In the second embodiment, as described above, a transmitting process for each transmission reservation for a transmission medium included in a transmission reservation can be canceled. Alternatively, it is also possible to construct the apparatus of the present invention such that the destination can be changed for each transmission reservation for a transmission medium included in a transmission reservation. In this case, a destination-changing button and an input field for a destination-changing character may be provided. The user selects a destination for a transmission reservation on the transmission reservation status screen view with a cursor, inputs a new destination in the destination-changing character string input field, and then clicks the destination-changing button, to thereby change the destination of the selected transmission reservation to the new destination.

As described above, according to the second embodiment, in transmitting the same image simultaneously by a plurality of different transmission media, an operation such as interruption of transmission, etc. can be executed for each transmission reservation, or for each transmission medium.

Third Embodiment

Next, a third embodiment of the present invention will be described.

The construction of the third embodiment is basically the same as that of the first embodiment, and therefore, description of the construction of the first embodiment is applied to the third embodiment where appropriate, and only components which differ from those of the first embodiment will be described.

FIG. 10 shows an example of a transmission reservation status screen view displayed on the display device 103 composed of a touch panel display according to the third embodiment.

In the transmission reservation status screen view, columns for reception number, reception time, number of pages (to be transmitted), destination (of transmission), and status (of transmission), are provided. The reception number is an identification number of the transmission reservation that is issued at the time when the transmission reservation is received. The touch panel display serves also as the input device 104, and the user can select a transmission reservation on the transmission reservation status screen view by placing the cursor at the reception number, and interrupt a transmitting process for the selected transmission reservation by clicking a cancel button 302.

Figure 11:
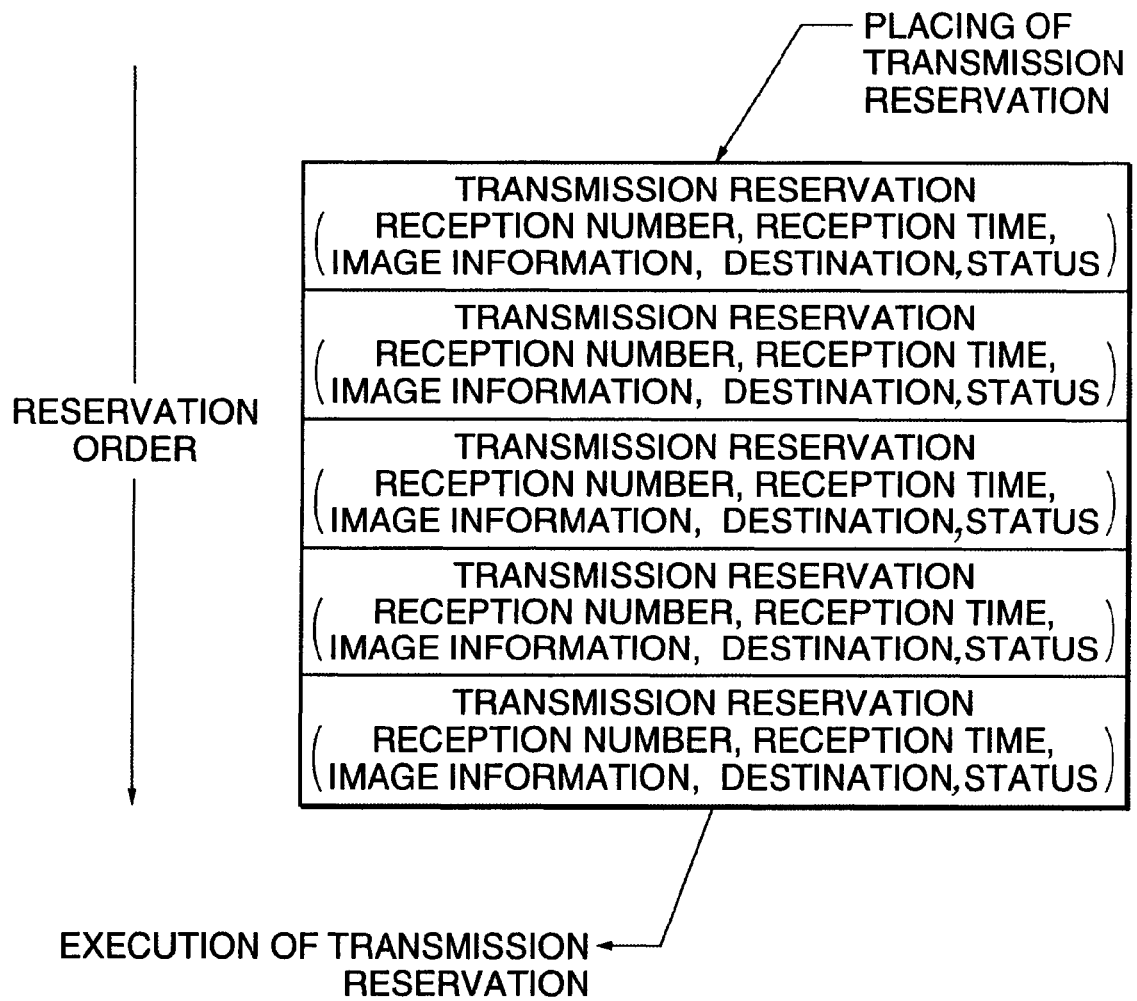
FIG. 11 is a schematic view showing a transmission reservation queue used in the third embodiment.

FIG. 11 shows a transmission reservation queue.

A new transmission reservation is added to the end of the transmission reservation queue, and a transmitting process is executed to carry out transmissions starting with the first transmission reservation in the order of reservation. Each transmission reservation is distinguished in the transmission reservation queue by the unique reception number.

The procedure of an enqueuing process for placing transmission reservations in the transmission reservation queue is the same as the one according to the first embodiment as shown in FIG. 5.

Figure 12:
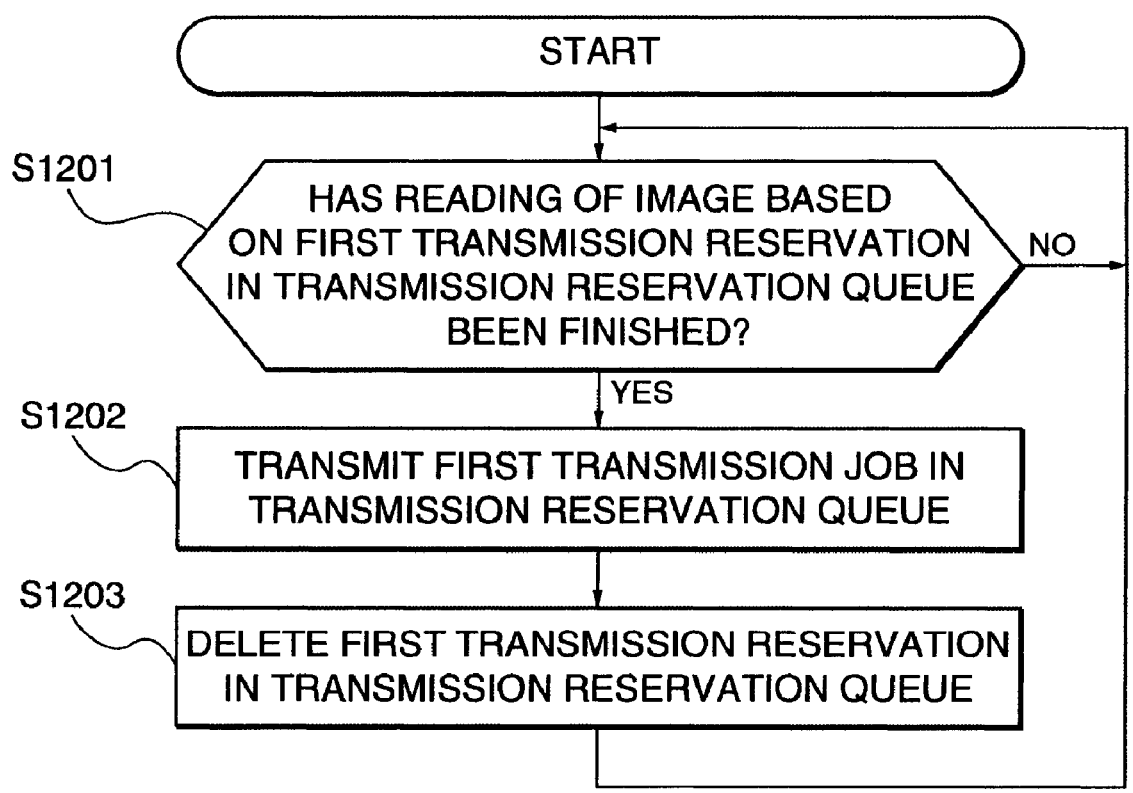
FIG. 12 is a flow chart showing the procedure of a transmitting process for reading out and executing transmission reservations stored in the transmission reservation queue in the order of reservation.

FIG. 12 is a flow chart showing the procedure of a transmitting process for reading out and executing transmission reservations stored in the transmission reservation queue in the order of reservation;

At a step S1201, it is determined whether an image reading process based on the first transmission reservation from among transmission reservations stored in the transmission reservation queue has been finished or not. If the reading has been completed, the process proceeds to a step S1202.

At the step S1202, the read image associated with the first transmission reservation is transmitted to the destination designated by the first transmission reservation.

At a step S1203, the transmission reservation for which a transmission has been completed is deleted from the transmission reservation queue, and the process returns to the step S1201, whereby the process proceeds to execution of the next transmission reservation.

Figure 13:
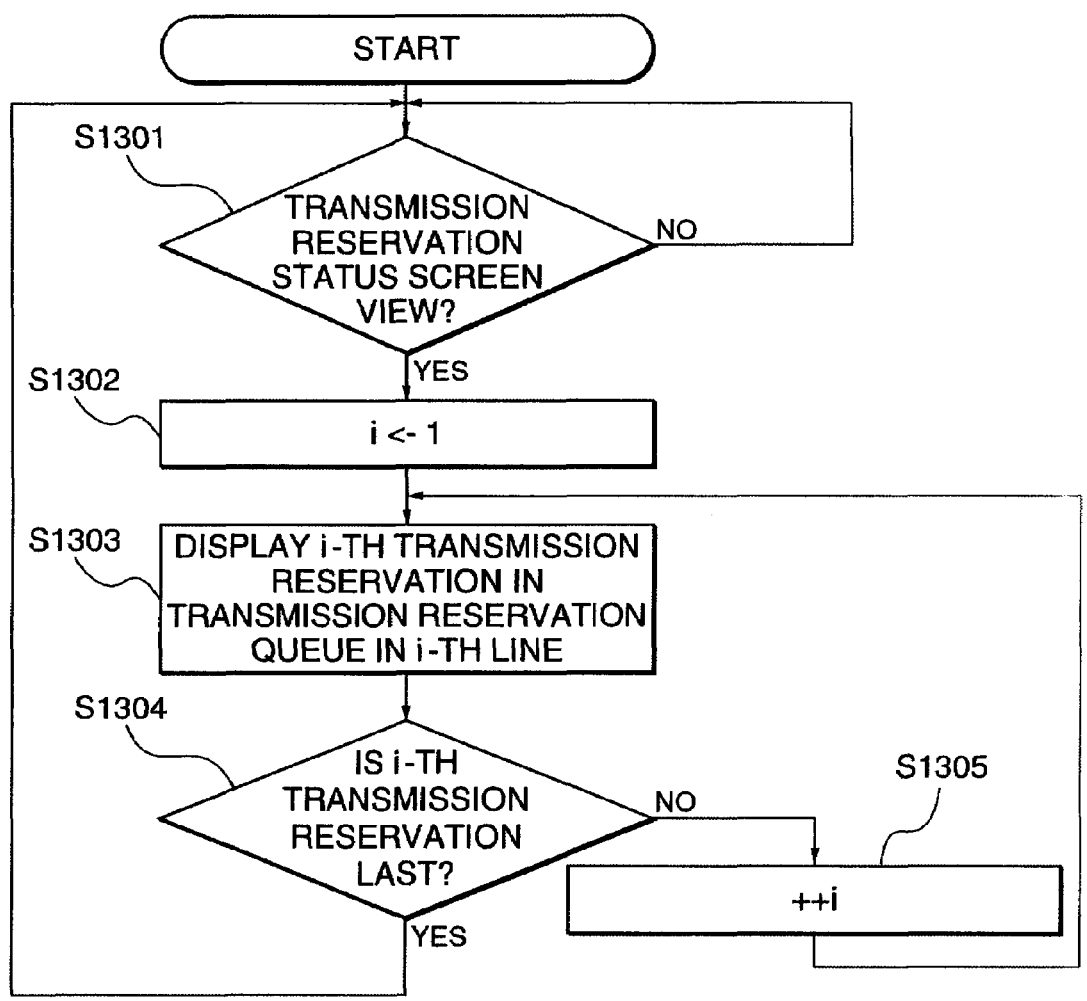
FIG. 13 is a flow chart showing the procedure of a process for displaying transmission reservation maintained in the transmission reservation queue on a transmission reservation status screen view.

FIG. 13 is a flow chart showing the procedure of a display process for displaying transmission reservations maintained in the transmission reservation queue on a transmission reservation status screen view as exemplified in FIG. 10.

At a step S1301, it is determined whether the display device is in a mode for displaying the transmission reservation status screen view or not. If the answer is affirmative, the process proceeds to a step S1302.

At the step S1302, an initial value 1 is substituted into the variable i. The variable i corresponds to the reservation order of each transmission reservation in the transmission reservation queue as shown in FIG. 11.

At a step S1303, information related to the i-th transmission reservation in the reservation order in the transmission reservation queue is copied onto the transmission reservation status screen view in the display format as shown in FIG. 10.

At a step S1304, it is determined whether the i-th transmission reservation in the reservation order in the transmission reservation queue is the last in transmission reservations that have been successively stored in the transmission reservation queue or not. If it is not the last transmission reservation, the variable i is incremented by one at a step S1305 and then the process returns to the step S1303. If it is the last transmission reservation, the process returns to the step S1301, and a display process for displaying the transmission status screen view is newly executed. whereby the latest transmission reservation status screen view is always prepared.

Figure 14:
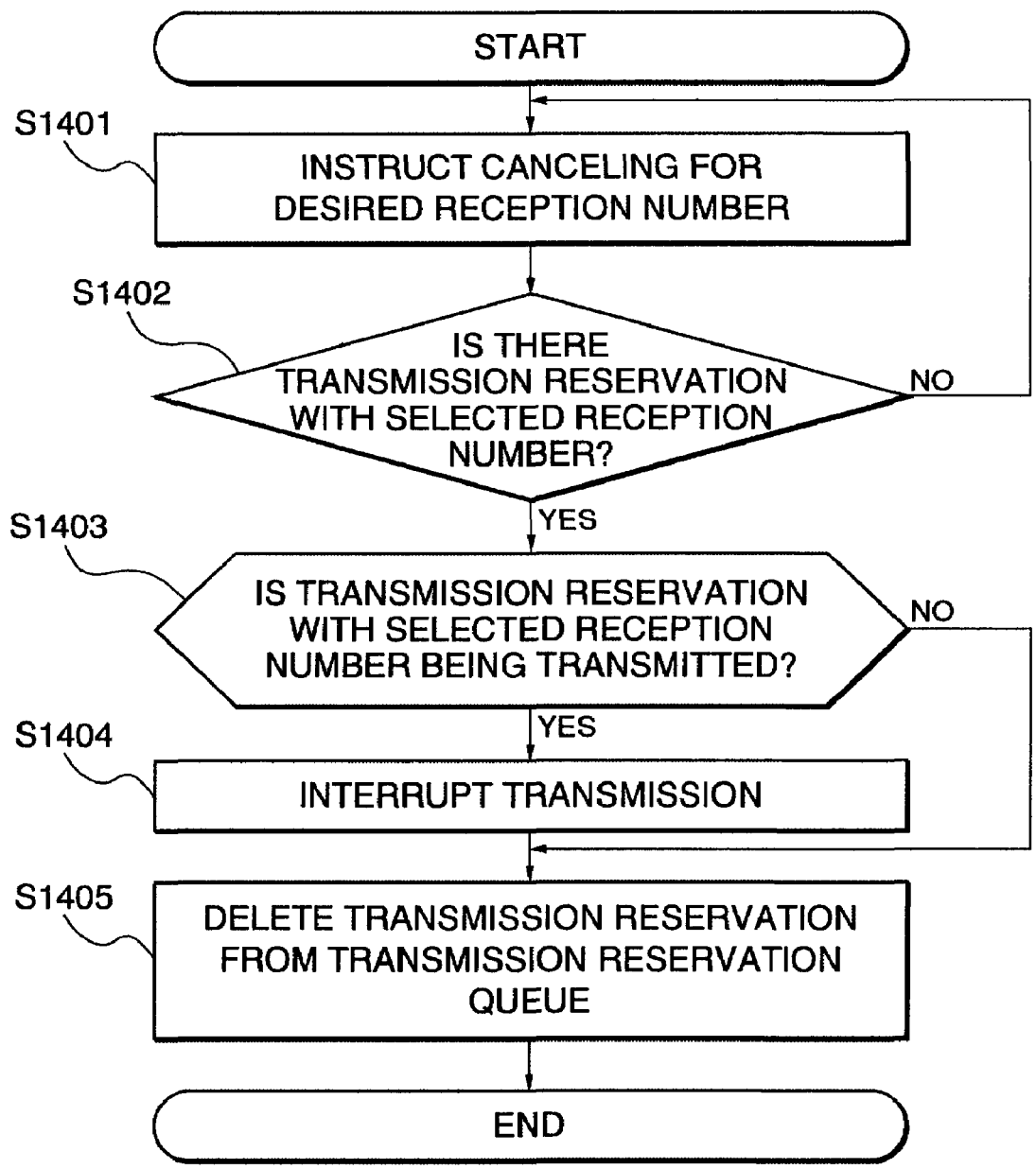
FIG. 14 is a flow chart showing the procedure of a canceling process for canceling a transmission reservation retained in the transmission reservation queue according to the user's will.

FIG. 14 is a flow chart showing the procedure of a canceling process for canceling a transmission reservation retained in the transmission reservation queue based on the user's will.

At a step S1401, the user selects a desired reception number with the cursor on the transmission reservation status screen view as exemplified in FIG. 10, and clicks the cancel button 302.

At a step S1402, it is determined whether the transmission reservation with the reception number selected by the user exists in the transmission reservation queue or not. If it exists, the process proceeds to a step S1403. If it does not exist, the process returns to the step S1401, and waits for the next clicking of the cancel button 302.

At the step S1403, it is determined whether a transmitting process based on the transmission reservation with the reception number selected by the user is being executed or not. If it is being executed, the process proceeds to a step S1404 and interrupts the transmitting process. If it is not being executed, the process skips the step S1404.

At a step S1405, the transmission reservation with the reception number selected by the user is deleted from the transmission reservation queue, and the process is terminated.

The transmission reservation canceled by the user may not be completely invalidated, but only temporarily removed from the transmission reservation queue to be kept on standby in another area and may be returned later to the transmission reservation queue.

As described above, according to the third embodiment, when the user designates a specific transmission reservation and clicks the cancel button 302, a transmitting process based on the specified transmission reservation is immediately stopped. Thus, if a transmitting process for a transmission reservation requires long time, the user can perform the interrupting process on the transmission reservation to thereby suspend the execution of the transmitting process for the transmission reservation that requires long time. That is, according to the third embodiment, when a transmitting process for the first transmission reservation is time-consuming, a transmitting process for the second transmission reservation can be executed before execution of the first transmission reservation to thereby expedite completion of transmitting processes for a plurality of transmission reservations.

Fourth Embodiment

Next, a fourth embodiment of the present invention will be described.

The construction of the fourth embodiment is basically the same as that of the third embodiment, and therefore, description of the construction of the third embodiment is applied to the fourth embodiment where appropriate, and only components which differ from those of the third embodiment will be described.

Figure 15:
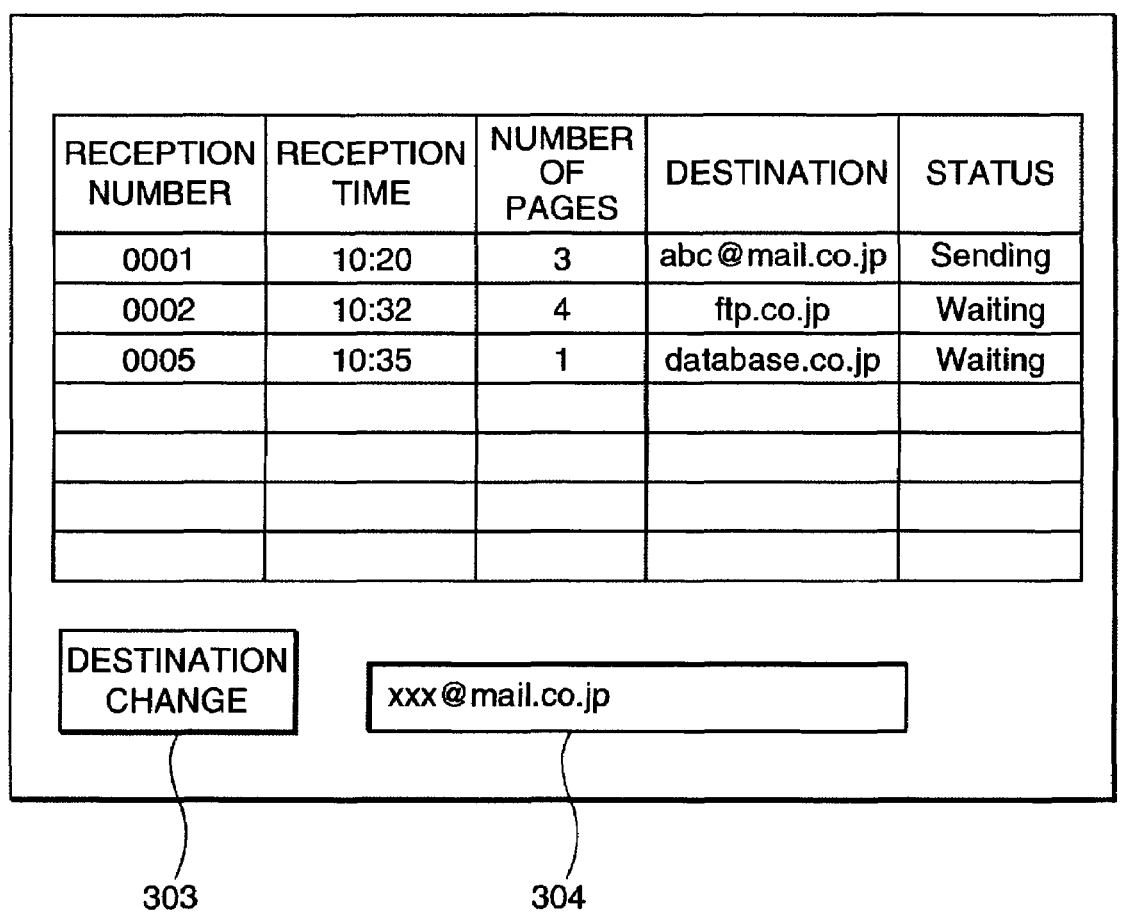
FIG. 15 is a view showing an example of a transmission reservation status screen view displayed on the display device which is composed of a touch panel display, according to a fourth embodiment of the present invention.

FIG. 15 shows an example of a transmission reservation status screen view displayed on the display device 103 composed of a touch panel display according to the fourth embodiment.

In the transmission reservation status screen view, columns for reception number, reception time, number of pages (to be transmitted), destination (of transmission), and status (of transmission), are provided. The reception number is an identification number of the transmission reservation that is issued at the time when the transmission reservation is received. A destination-changing button 303 and an input field 304 for a destination-changing character string are newly provided. The touch panel display serves also as the input device 104, and the user can select a transmission reservation on the transmission reservation status screen view by placing the cursor at the reception number, and change the destination in the selected transmission reservation to a new destination by inputting the new destination in the destination-changing character string input field 304 and by clicking the destination-changing button 303.

Figure 16:
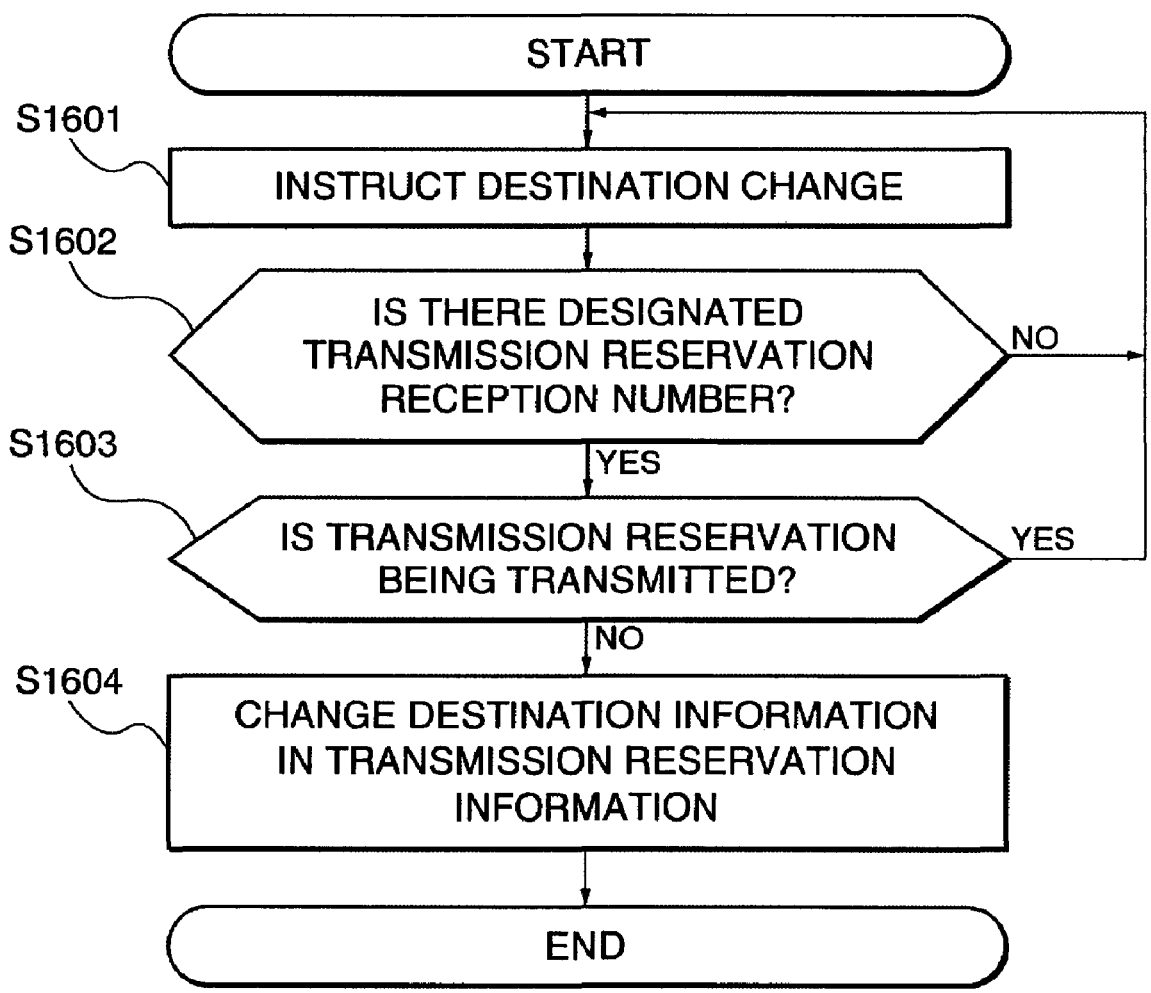
FIG. 16 is a flow chart showing the procedure of a destination changing process for changing the destination of a transmission reservation retained in the transmission reservation queue.

FIG. 16 is a flow chart showing the procedure of a destination changing process for changing the destination of a transmission reservation retained in the transmission reservation queue.

At a step S1601, the user designates a transmission reservation using the transmission reservation status screen view as exemplified in FIG. 15, inputs a new destination, and clicks the destination-changing button 303.

At a step S1602, it is determined whether the transmission reservation designated by the user exists in the transmission reservation queue or not. If it exists, the process proceeds to a step S1603. If it does not exist, the process returns to the step S1601, and waits for the next clicking of the destination-changing button 303.

At the step S1603, it is determined whether a transmitting process based on the transmission reservation designated by the user is being executed or not. If it is being executed, the process returns to step S1601, and waits for the next clicking of the destination-changing button 303. If it is not being executed, the destination in the transmission reservation in the transmission reservation queue is changed to the destination input to the destination-changing character string input field 304 at a step S1604.

According to the fourth embodiment, since the destination changing process at the step S1604 is executed in the transmission reservation queue, a transmitting process can be carried out to transmit the image exactly to the changed destination.

Fifth Embodiment

Next, a fifth embodiment of the present invention will be described.

The construction of the fifth embodiment is basically the same as that of the third embodiment, and therefore, description of the construction of the third embodiment is applied to the fifth embodiment where appropriate, and only components which differ from those of the third embodiment will be described.

Figure 17:
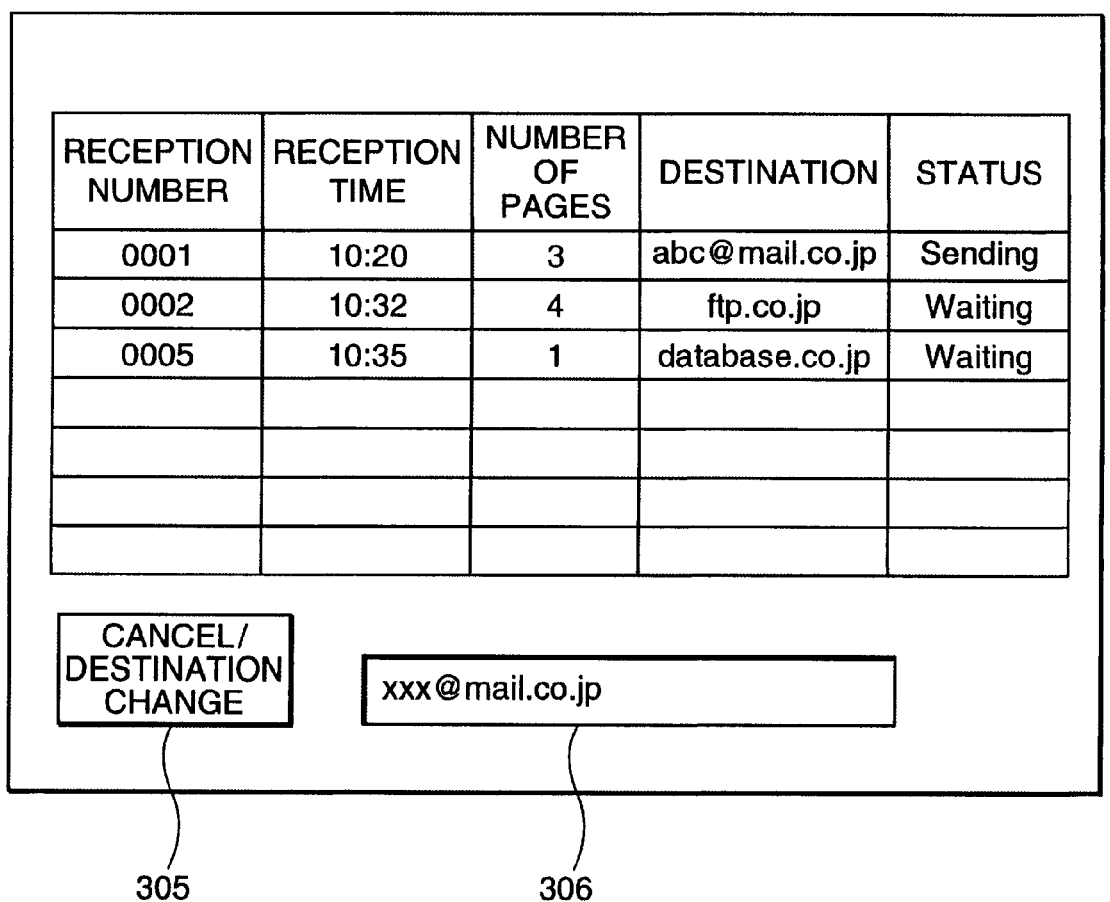
FIG. 17 is a view showing an example of a screen view of transmission reservation status displayed on the display device which is composed of a touch panel display, according to a fifth embodiment of the present invention.

FIG. 17 shows an example of a transmission reservation status screen view displayed on the display device 103 composed of a touch panel display according to the fifth embodiment.

In the transmission reservation status screen view, columns for reception number, reception time, number of pages (to be transmitted), destination (of transmission), and status (of transmission), are provided. The reception number is an identification number of the transmission reservation that is issued at the time when the transmission reservation is received. In the fifth embodiment, a cancel/destination-changing button 305 and a destination-changing character string input field 306 are newly provided, and the touch panel display serves also as the input device 104. The cancel/destination-changing button 305 is for inputting instructions for interrupting a transmission and for changing the destination of the interrupted transmission to a destination newly input to the destination-changing character string input field 306, so as for a transmitting process for the interrupted transmission to be executed again. By selecting a specific position on the transmission reservation status screen view and then clicking the cancel/destination-changing button 305, a process for interrupting a transmission and changing the destination corresponding to the selected specific position is executed.

Figure 18:
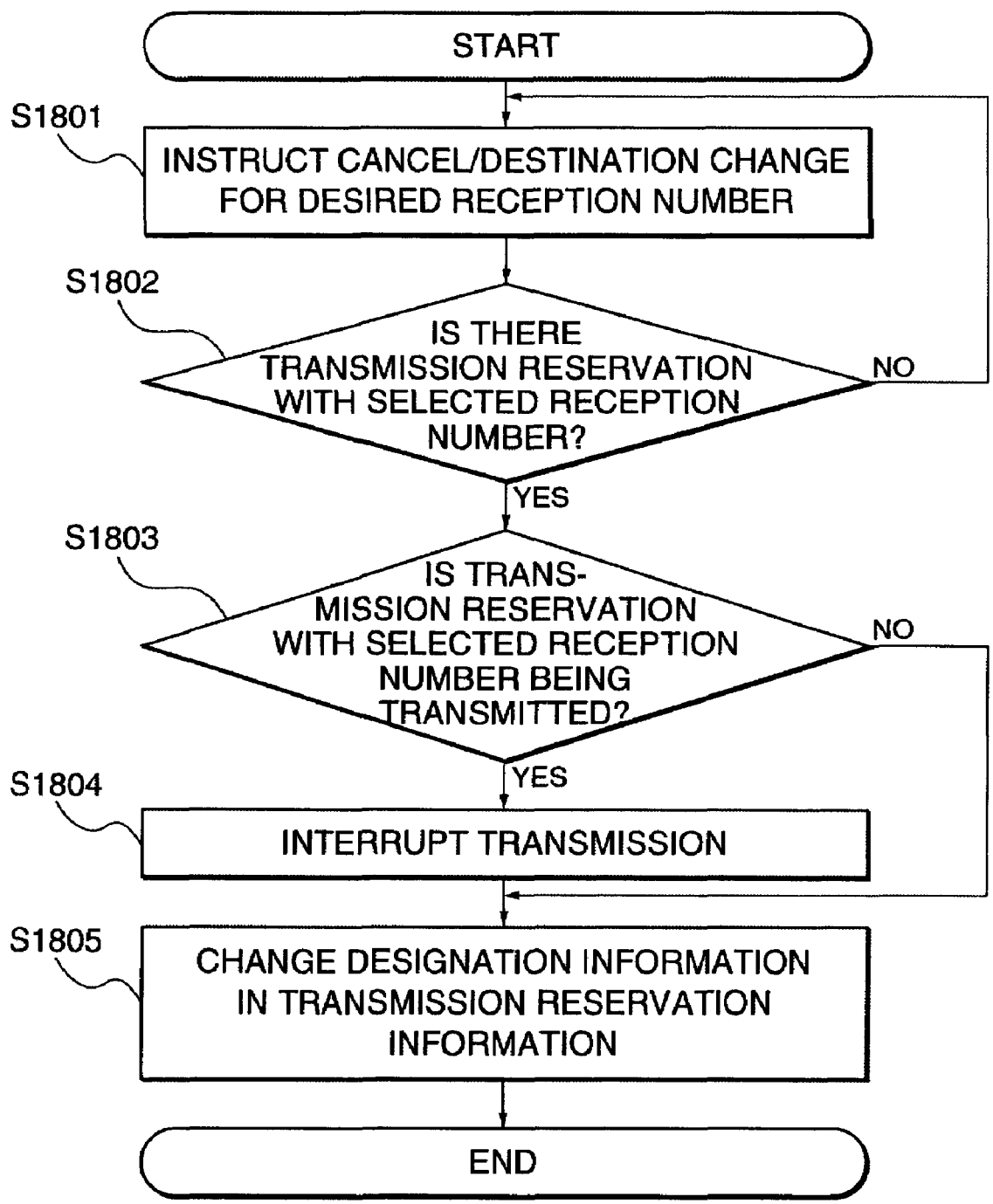
FIG. 18 is a flow chart showing the procedure of a process for canceling a transmission reservation retained in the transmission reservation queue and changing the destination.

FIG. 18 is a flow chart showing the procedure of a process for canceling a transmission reservation retained in the transmission reservation queue at the user's will and changing the destination to execute a transmission based on the canceled transmission reservation.

At a step S1801, the user selects a desired reception number with the cursor on the transmission reservation status screen view as exemplified in FIG. 17, and clicks the cancel/destination-changing button 305.

At a step S1802, it is determined whether the transmission reservation with the reception number selected by the user exists in the transmission reservation queue or not. If it exists, the process proceeds to a step S1803. If it does not exist, the process returns to the step S1801, and waits for the next clicking of the cancel/destination-changing button 305.

At the step S1803, it is determined whether a transmitting process based on the transmission reservation with the reception number selected by the user is being executed or not. If it is being executed, the process proceeds to a step S1804, where the transmitting process is interrupted. If it is not being executed, the process skips the step S1804.

At a step S1805, the destination of the transmission reservation designated by the user is changed in the transmission reservation queue to the new destination input to the destination-changing character string input field 306.

According to the fifth embodiment, since the destination changing process at the step S1805 is executed in the transmission reservation queue, a transmitting process can be carried out to transmit the image exactly to the changed destination. The transmission reservation that has been subjected to the cancel/destination-changing process is transmitted anew by the flow of processing as shown in FIG. 12 that executes transmission reservations stored on standby in the transmission reservation queue.

As described above, according to the fifth embodiment, when the user designates a specific transmission reservation and clicks the cancel/destination-changing button 305, a transmitting process based on the designated transmission reservation is immediately stopped and the destination information is changed to the new destination. Thus, if a transmitting process for a transmission reservation requires long time, the user can perform the cancel/destination changing process on the transmission reservation to thereby change the destination before execution of the transmitting process for the transmission reservation that requires long time. Thus, according to the fifth embodiment, when processing of a transmission reservation requires long time, correction of a wrong destination and re-transmission can be expedited. Of course, in this case, alternatively, the transmission reservation may be invalidated.

In addition to or alternatively to interruption of a transmission based on a transmission reservation, the transmission may be interrupted for each transmission medium (transmission protocol). In this case, for example, an FTP may be designated as the transmission medium to be subjected to the interruption, to thereby display a list of transmission status for the FTP extracted from all the transmission reservations on the touch panel, based on which transmission interruption and destination change are executed in a manner as described above.

In performing this processing, "reception number" in the flow chart of FIG. 18 should be replaced by "transmission medium"

It is to be understood that the present invention may also be realized by supplying a system or an apparatus with a storage medium in which program codes of software that realizes the functions of the above described embodiments are recorded, and causing a computer (or CPU, MPU) of the system or apparatus to read out and execute the program codes stored in the storage medium.

In this case, the program codes themselves read out from the storage medium realize the above described functions of the embodiments, so that the storage medium storing the program codes also constitute the present invention.

The storage medium for supplying the program codes may be selected from, for example, a floppy disk, hard disk, optical disk, magneto-optical disk, CD-ROM, CD-R, magnetic tape, non-volatile memory card, and ROM.

The functions of the above described embodiments may be achieved not only by executing program codes read out by a computer, but also by causing an operating system (OS) that operates on the computer, to perform a part or the whole of the actual operations according to instructions of the program codes.

Furthermore, it is to be understood that the program codes read out from the storage medium may be written into a memory provided in an expanded board inserted in the computer, or an expanded unit connected to the computer, and a CPU or the like provided in the expanded board or expanded unit may actually perform a part or the whole of the operations according to instructions of the program codes, so as to accomplish the functions of the above described embodiments.

Although the present invention has been described with reference to preferred embodiments thereof, the invention is not limited to these embodiments, and various changes and modifications may be made within the scope of the appended claims.

What is claimed is:

1. A data communication apparatus comprising:
    an input unit adapted to input an image to be transmitted;
    a transmitting unit that is capable of transmitting an image by a plurality of transmission protocols;
    a control unit connected to the input unit and the transmitting unit and adapted to designate a plurality of destinations for the same image to be transmitted and manage information relating to the transmission made by said transmitting unit by associating a same predetermined identifier to the plurality of transmissions of the same image, wherein each of the plurality of destinations is associated with any one of the plurality of transmission protocols by which the transmitting unit is capable of transmitting the image;
    a display unit connected to the control unit and adapted to display that the same identifier is assigned to each of the plurality of transmissions to the plurality of destinations designated for the same image and adapted to display a list based on information relating to the plurality of transmissions; and
    a reception unit connected to the control unit and adapted to receive instructions from a user,
    wherein the control unit performs a processing corresponding to an instruction for the plurality of transmissions associated with the identifier in response to the reception unit receiving the instruction together with the identifier and performs a processing corresponding to an instruction for a specific one of the plurality of transmissions in response to the reception unit receiving the instruction together with the specific one of the plurality of transmissions, and
    wherein the transmitting unit transmits the same image to the plurality of destinations designated by the control unit by the respective transmission protocols.

2. A data communication apparatus according to claim 1, wherein the plurality of transmission protocols include at least one of E-mail or FTP (File Transfer protocol).

3. A data communication apparatus according to claim 1, further comprising a reader for reading originals and generating the images thereof, and wherein said input unit inputs the image from said reader.

4. A data communication apparatus according to claim 1, wherein said information includes items associated with the respective destinations, and said control unit discriminates said items from each other according to the respective transmission protocols.

5. A data communication apparatus according to claim 1, wherein said control unit is responsive to receiving an instruction for transmission interruption together with the identifier by said reception unit, for interrupting transmissions to the plurality of destinations corresponding to the identifier.

6. A data communication apparatus according to claim 1, wherein said control unit is responsive to receiving an instruction for transmission interruption associated with one of the respective transmission protocols by said reception unit, for interrupting a transmission to one of the destinations that is associated with the one of the respective transmission protocols.

7. A data communication apparatus according to claim 1, wherein said control unit is responsive to receiving an instruction for changing of destination by said reception unit, for changing one of the plurality of destinations for which the changing of destination was instructed.

8. A data communication apparatus according to claim 1, wherein said control unit manages a transmission request for the plurality of transmissions of the same image to the designated plurality of destinations, and associates a unique identifier as the same predetermined identifier to the transmission request, and wherein said control unit associates other unique identifiers as the same predetermined identifier to other transmission requests.

9. A transmission managing method for a data communication apparatus which is capable of transmitting data by a plurality of transmission protocols, comprising the steps of:

inputting an image;

designating a plurality of destinations for the same image input in the input step, each of the plurality of destinations being associated with any one of the plurality of transmission protocols by which the transmitting unit is capable of transmitting the image;

transmitting the same image to the plurality of destinations designated in the designating step;

managing information relating to the transmission made in the transmitting step by associating a same predetermined identifier to the plurality of transmissions of the same image;

displaying that the same identifier is assigned to each of the plurality of transmissions to the plurality of destinations designated for the same image and displaying a list based on information relating to the plurality of transmissions;

receiving instructions from a user; and performing a processing corresponding to an instruction for the plurality of transmissions associated with the identifier in response to receiving the instruction together with the identifier, and a processing corresponding to an instruction for a specific one of the plurality of transmissions in response to receiving the instruction together with the specific one of the plurality of transmissions.

10. A storage device storing a control program executable by a computer for controlling a data communication apparatus which is capable of data by a plurality of transmission protocols, the control program containing codes for:

inputting an image;

designating a plurality of destinations for the same image input by the inputting code, each of the plurality of destinations being associated with any one of the plurality of transmission protocols by which the transmitting unit is capable of transmitting the image;

transmitting the same image to the plurality of destinations designated by the designating code;

managing information relating to the transmission made by the transmitting code by associating a same predetermined identifier to the plurality of transmissions of the same image;

displaying that the same identifier is assigned to each of the plurality of transmissions to the plurality of destinations designated for the same image and displaying a list based on information relating to the plurality of transmissions;

receiving instructions from a user; and performing a processing corresponding to an instruction for the plurality of transmissions associated with the identifier in response to receiving the instruction together with the identifier, and a processing corresponding to an instruction for a specific one of the plurality of transmissions in response to receiving the instruction together with the specific one of the plurality of transmissions.

* * * * *